United States Patent [19]

Frascaroli et al.

[11] Patent Number: 4,600,173
[45] Date of Patent: Jul. 15, 1986

[54] LOAD-BEARING BAR FOR OFFICE FURNITURE

[75] Inventors: Francesco Frascaroli, Bologna; Carlo Biondi, S. Giovanni in Persiceto, both of Italy

[73] Assignee: C.O.M. Cooperativa Operai Metallurgici S.C.R.L., Bologna, Italy

[21] Appl. No.: 601,853

[22] Filed: Apr. 18, 1984

[30] Foreign Application Priority Data

Apr. 22, 1983 [IT] Italy ................... 4849/83[U]

[51] Int. Cl.$^4$ ............................................. F16L 3/22
[52] U.S. Cl. ................................ 248/68.1; 52/221; 248/228; 403/190; 403/292; 312/263
[58] Field of Search ........... 52/220, 221, 696, 726; 174/48, 49, 97, 101; 403/190, 191, 292, 294, 234; 312/263; 108/64; 24/486, 569; 248/68.1, 228, 231.4, 49

[56] References Cited

U.S. PATENT DOCUMENTS

| 297,153 | 4/1884 | Muir | 403/292 |
|---|---|---|---|
| 893,378 | 7/1908 | Rosenfeld | 248/228 |
| 1,322,801 | 11/1919 | Lewis | 403/190 |
| 3,598,349 | 8/1971 | Drake | 248/68.1 X |
| 3,618,882 | 9/1969 | Podedworny | 248/68.1 |
| 3,948,473 | 4/1976 | Mason | 248/68.1 X |
| 4,049,082 | 9/1977 | Reid | 52/696 X |
| 4,323,291 | 4/1982 | Ball | 312/194 |

FOREIGN PATENT DOCUMENTS

| 615814 | 2/1980 | Switzerland | 108/64 |
|---|---|---|---|
| 511190 | 8/1939 | United Kingdom | 403/292 |
| 1221294 | 2/1971 | United Kingdom | 174/48 |

OTHER PUBLICATIONS

Globetray ® Cable Tray Systems catalog, United States Gypsum Company, 1979, Sections 1-7.
Fiberglass Cable Tray Systems catalog, Robroy Industries, 1982, pp. 1-19.

*Primary Examiner*—Alfred C. Perham
*Assistant Examiner*—Jean M. LaKemper
*Attorney, Agent, or Firm*—Fuller, House & Hohenfeldt

[57] ABSTRACT

A load-bearing bar (1) for office furniture, the bar having a modular structure and being defined by a number of interconnected modules each consisting in a bar segment (18) having a substantially U-shaped cross-section. Each bar segment (18) is formed by two lateral beams (2) rigidly connected to each other by an intermediate base element (3) which supports a channel-defining member (59) for telephonic and electric wiring.

3 Claims, 5 Drawing Figures

LOAD-BEARING BAR FOR OFFICE FURNITURE

BACKGROUND OF THE INVENTION

1. Field of the Invention

The present invention relates to a load-bearing bar for office furniture.

2. Description of the Prior Art

Modern offices are generally provided with furniture normally including several types of tables or desks, the work tops of which are adapted to support a number of electrical appliances or, in general, wire-connected appliances such as typewriters, computer terminals, lamps, telephones, etc.

The above tables or desks are normally very expensive since they need individual supports and electrical and telephonic connections.

SUMMARY OF THE INVENTION

It is an object of the present invention to provide a support structure which is capable of supporting a number of office work tops and of conveying all necessary telephonic and electric wiring.

It is also an object of the present invention to provide a support structure in the form of a load-bearing bar which may be assembled in a very simple manner according to a large number of different configurations.

According to the invention there is provided a load-bearing bar for office furniture, said bar having a modular structure and comprising a number of modules and connecting means to interconnect said modules, each said module consisting in a bar segment having a substantially u-shaped cross-section and comprising two lateral parallel beams and an intermediate base element connecting said beams to each other; telephonic-and-electric-wiring channel-defining means being supported by said base element between said beams, and said connecting means co-operating with said beams.

BRIEF DESCRIPTION OF THE INVENTION

The invention will be described by way of example with reference to the accompanying drawings, in which:

FIG. 1 is an end view of a segment of a load-bearing bar in accordance with the present invention;

FIG. 4 is a sectional view of two connected bar segments arranged at right angles to one another.

DESCRIPTION OF THE PREFERRED EMBODIMENT

Figures 1, 4:
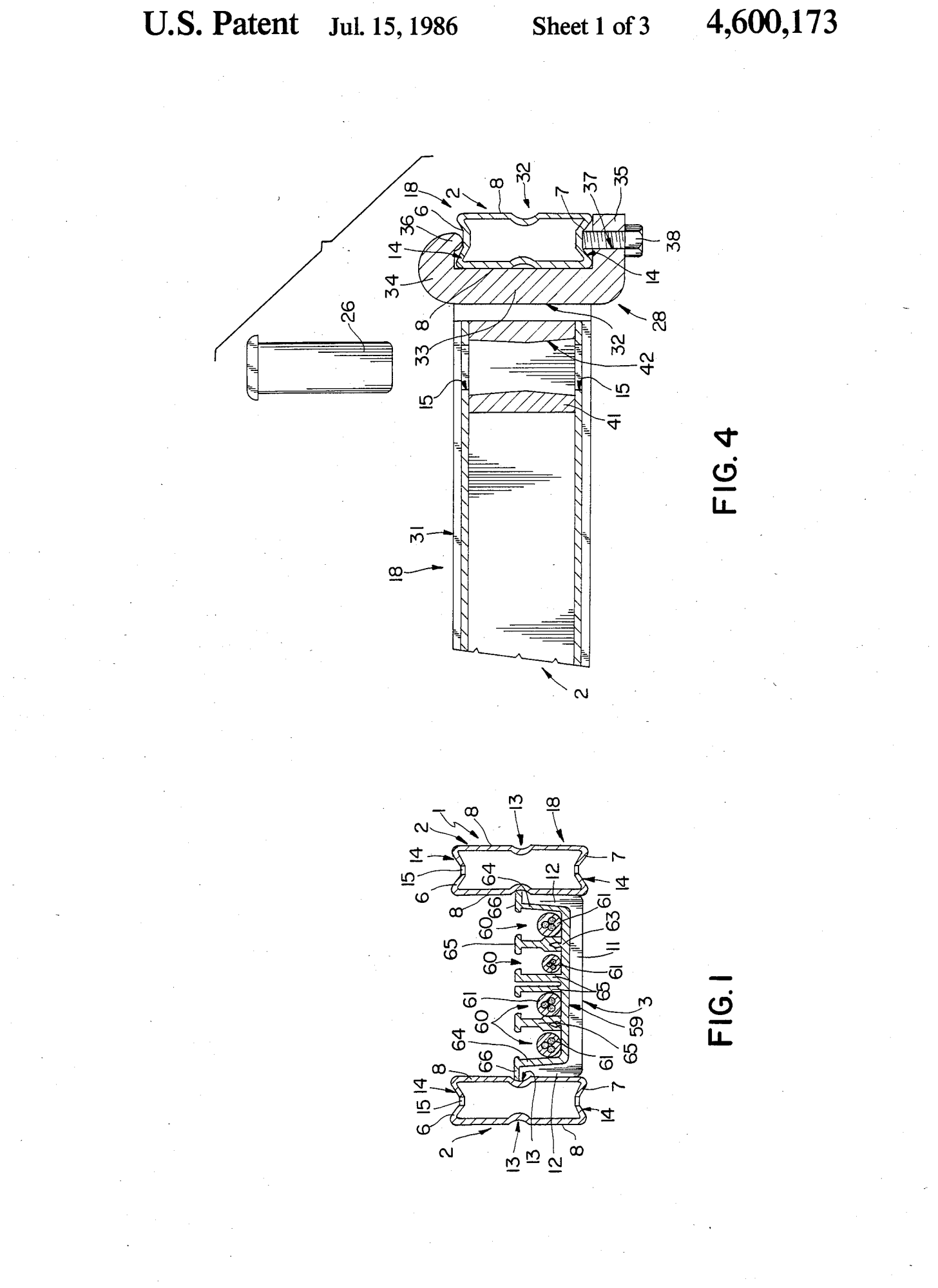
Figure 3:
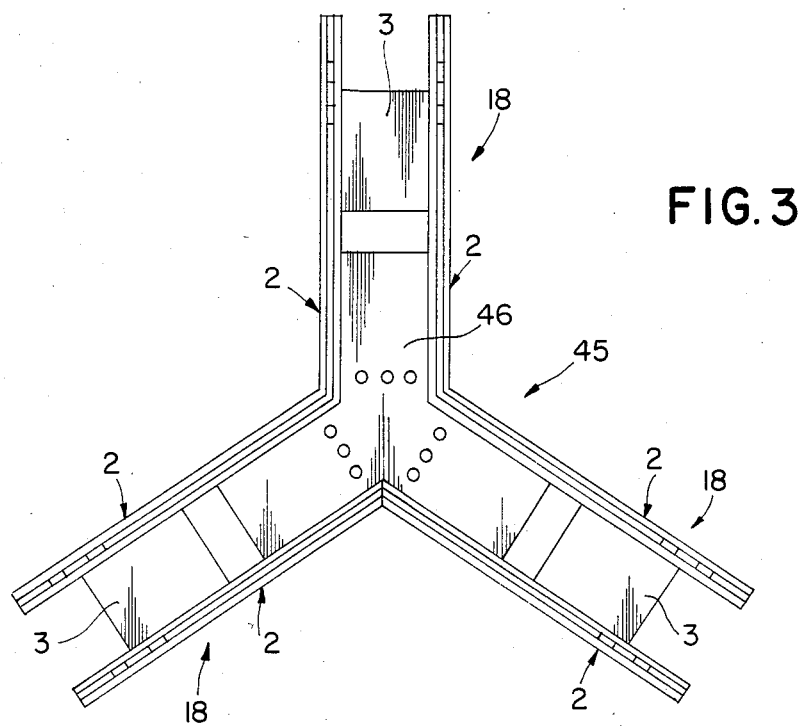
FIG. 3 is a top view of a connecting element for joining together three bar segments.

FIG. 1 shows a substantially U-shaped load-bearing bar 1 for office furniture work tops, bar 1 comprising a plurality of bar segments 18. Each bar segment 18 comprises two tubular, parallel lateral metal beams 2 connected to each other by means of a number of intermediate base elements 3. Each beam 2 has an essentially rectangular cross section and comprises a top wall 6, a bottom wall 7 and one inner and one outer side wall 8.

Element 3 is also U-shaped and comprises a centre portion 11 which defines, together with centre portions 11 on the other elements 3, a base wall for bar segment 18. Element 3 further comprises two side portions 12 connected to respective inner side walls 8 of the two beams 2. Side walls 8, top wall 6 and bottom wall 7 are provided with respective central axial grooves 13 and 14. Grooves 14 on walls 6 and 7 are provided with a number of through slots 15 arranged in pairs at a preset distance apart.

Figure 2:
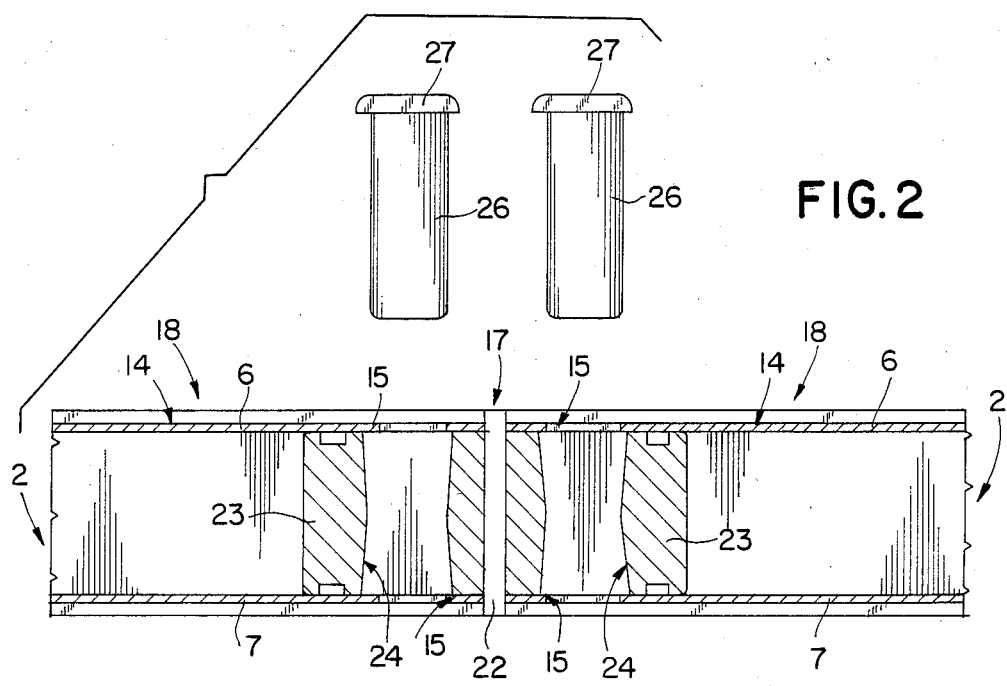
FIG. 2 is a sectional exploded view of two aligned bar segments connected together.

As shown in FIGS. 2 and 4, two bar segments 18 can be interconnected regardless of whether they have the same longitudinal axis, as shown in FIG. 2, or whether their longitudinal axes are perpendicular to each other, as shown in FIG. 4. In FIG. 2, number 17 indicates a connecting element between two beams 2 of two coaxial bar segments 18. Element 17 has a centre portion 22 from which two coaxial tabs 23 extend in opposite directions; each of the said tabs being housed inside a respective beam 2 of the corresponding segment 18. Each tab 23 has a through slot 24 coaxial with respective slots 15 on walls 6 and 7. Obviously, two connecting elements 17 will be needed for joining two segments 18. Slot 15 on wall 6 and slot 24 on respective tab 23 are engaged by a pin 26, the head 27 of which is larger than slot 15 and rests on wall 6 inside groove 14.

In FIG. 4, a connecting element 28 is shown which is arranged between two segments 18 that are arranged with their longitudinal axes at right angles with each other and are indicated, for the sake of clarity, at 30 and 31. In this case, the two beams 2 of segment 30 are joined to a single beam 2 of segment 31. Two connecting elements 28 (only one being shown) are used for connecting segments 30 and 31 together. Each element 28 has an essentially U-shaped bracket 32 designed to hook laterally on to one beam 2 of segment 31. Bracket 32 has a centre portion 33, with its front face towards the outer side wall 8 of beam 2, a top arm 34 and a bottom arm 35. The top arm 34 is bent to form a hook 36 engaging groove 14 on wall 6, whereas the bottom arm 35 is straight and has a threaded through hole 37 engaged by a screw 38, the back top end of which engages groove 14 on wall 7. From the face of centre portion 33, opposite the one facing wall 8 of beam 2 of segment 31, a tab 41 extends, which is similar to tab 23 on element 17 and is housed inside a beam 2 of segment 30 with a through slot 42 coaxial with slots 15 on walls 6 and 7. Slot 15 on wall 6 and slot 42 are engaged by a pin 26.

Number 45 in FIG. 3 indicates a star-shaped, in the example a Y-shaped, auxiliary element, designed to interconnect three different bar segments 18 and made by welding together three bar segments 18, which may be of shorter length. Each single segment 18 of element 45 is connectable to a respective bar segment 18 using two connecting elements 17 in the same way as for joining the two aligned segments 18 in FIG. 2. The segments 18 components of element 45 are numbered in the same way as the segment 18 components in the other Figures. In addition to a number of intermediate base elements 3, element 45 also has a centrally located intermediate base element 46 shaped differently from the others in that it is located at the point in which the ends of the segments 18 on element 45 are connected.

FIGS. 2, 3 and 4 show various ways of connecting bar segments 18, though, obviously, other arrangements can also be provided for. For example, a star-shaped auxiliary element in the shape of an X can be provided; and a straight-line segment 18 can be connected to another, the longitudinal axis of which describes an arc of a circle. In view of the various ways described so far of joining the segments of bar 1, it will be clear that countless arrangements can be provided for on the office furniture fitted with bar 1.

Figure 5:
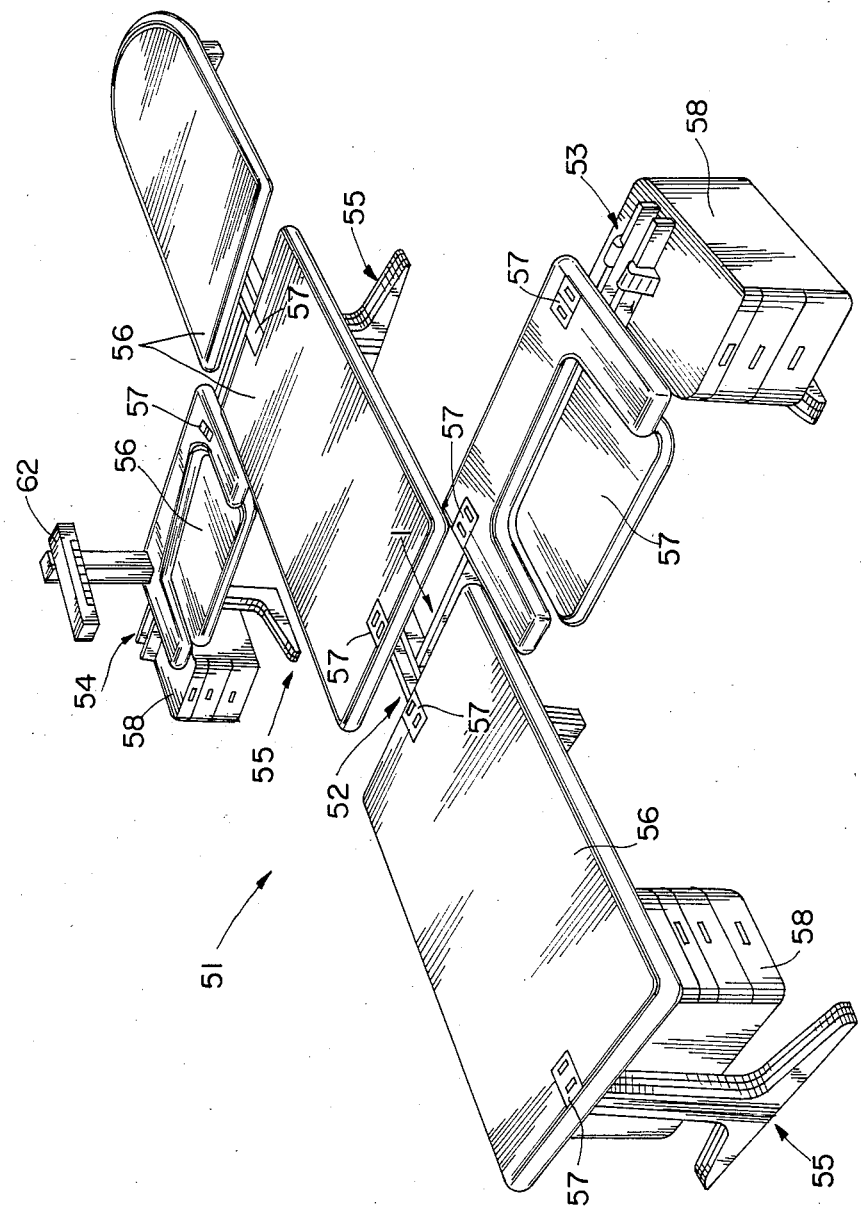
FIG. 5 is a perspective view of a number of office work tops supported by a bar in accordance with the present invention.

One of the above arrangements is shown by way of example in FIG. 5, where numeral 51 indicates an office unit, bar 1 of which comprises one main branch 52 and two branches 53,54 perpendicular to main branch 52, and is supported by a number of uprights 55. As shown in FIG. 5, a number of work tops 56 are arranged above bar 1 and fixed thereto, and are each provided with electrical and telephone sockets 57. A number of drawer cabinets 58 are arranged underneath bar 1 and fixed thereto.

As shown in FIG. 1, each bar segment 18 is provided with an inner comb element 59 defining a number of channels 60 accommodating electric and telephone cables 61 connected to sockets 57 or other electrical appliances such as a lamp 62 shown in FIG. 5. Element 59 rests on the centre portions 11 of intermediate elements 3 and runs right along bar 1. In more detail element 59 has a base wall 63, two side walls 64 and a number of dividing walls 65 defining channels 60. From the top edge of each side wall 64 a transverse tab 66 extends laterally outwards and is housed inside groove 13 on inner side wall 8 of the respective beam 2.

The advantages of the present invention will be clear from the description given.

In particular, bar 1 provides for any arrangement of an office unit load-bearing structure by enabling branches of any longitudinal extension to be joined in any direction and, as already stated, with no difficulty whatsoever. Bar 1 is also designed for housing electric and telephonic cables and, above all, provides for easy assembly and, consequently, lower manufacturing cost owing to its modular construction.

Branches of bar 1 of any length and shape may be, in fact, very easily obtained by assembling together a number of bar segments 18 by means of connecting elements 17,28 and 45.

We claim:

1. A load bearing bar for office furniture, said bar having a modular structure and comprising:
   (a) a plurality of bar segments having a substantially U-shaped cross-section, each bar segment comprising:
      (i) two laterally spaced parallel tubular beams of substantially rectangular cross-section with a pair of opposed upper and lower walls and a pair of opposed inside and outside walls, each wall defining a longitudinal central groove, the upper and lower walls defining a pair of aligned substantially rectangular slots through the grooves near each end of each beam, the rectangular slots longitudinal axes being parallel to the beam longitudinal axis;
      (ii) at least one generally U-shaped intermediate base element interposed between the parallel rectangular beams, the base element having upturned side portions connected to the respective inside walls of the beams, thereby connecting the beams to each other;
      (iii) a wiring channel supported by the base element and having a pair of laterally spaced upstanding resilient side walls terminating in transverse tabs extending laterally outwardly from the side walls to be resiliently received in the grooves of the beams inside walls; and
   (b) a pair of connecting elements for rigidly connecting longitudinally aligned bar segments to each other, each connecting element having a center portion interposed between aligned ends of a pair of bar segment beams, each connecting element having coaxial tabs oppositely extending from the center portion and being received within the aligned ends of the pair of beams, each tab having a generally rectangular transverse slot therethrough aligned with the slots in the beam upper and lower walls when the tab is inserted into the beam end; and
   (c) a pair of pins associated with each connecting element, each pin having a generally rectangular shank being inserted through a slot in the beam upper wall and through an aligned slot in the connecting element tab, the pin having a head larger than the beam slot for resting on the beam upper wall.

2. A load bearing bar for office furniture, said bar having a modular structure and comprising:
   (a) a plurality of bar segments having a substantially U-shaped cross-section, each bar segment comprising:
      (i) two laterally spaced parallel tubular beams of substantially rectangular cross-section with a pair of opposed upper and lower walls and a pair of opposed inside and outside walls, each wall defining a longitudinal central groove, the upper and lower walls defining a pair of aligned substantially rectangular slots through the grooves near each end of each beam, the rectangular slots longitudinal axes being parallel to the beam longitudinal axis;
      (ii) at least one generally U-shaped intermediate base element interposed between the parallel rectangular beams, the base element having upturned side portions connected to the respective inside walls of the beams, thereby connecting the beams to each other;
      (iii) a wiring channel supported by the base element and having a pair of laterally spaced upstanding resilient side walls terminating in transverse tabs extending laterally outwardly from the side walls to be resiliently received in the grooves of the beams inside walls; and
   (b) a pair of connecting elements for rigidly connecting a first bar segment at generally right angles to a second bar segment comprising:
      (i) a generally U-shaped bracket having a substantially straight center portion with a front face for facing contact with the inside wall of a rectangular beam of the second bar segment, a top arm having a hook adapted to engage the longitudinal groove of the second bar segment beam upper wall, a substantially straight bottom arm for facing contact with the second bar segment beam lower wall, the bottom arm defining a threaded opening therethrough aligned with the longitudinal groove of the beam lower wall, a center section joined to the center portion and being interposed between the end of the first bar segment and the center portion, and a tab extending from the center portion oppositely from the front face and being inserted into the end of a first bar segment tubular beam, the tab defining a transverse generally rectangular slot therethrough aligned with the aligned slots in the beam upper and lower walls when the tab is inserted into the beam; and (ii) a fastener threaded through the connecting element bottom arm and into engagement with the groove in the second bar segment beam lower wall; and (c) a pair of pins associated with each connecting element, each pin having a generally rectangular shank being inserted through a slot in the beam upper wall and through an aligned slot in the connecting element tab, the pin having a head larger than the beam slot for resting on the beam upper wall, so that the connecting element rigidly connects the first bar segment to the second bar segment when the threaded fasteners tightly engage the longitudinal groove in the second bar segment lower wall.

3. A load bearing bar for office furniture, said bar having a modular structure and comprising:

(a) a plurality of bar segments having a substantially U-shaped cross-section, each bar segment comprising:

(i) two laterally spaced parallel tubular beams of substantially rectangular cross-section with a pair of opposed upper and lower walls and a pair of opposed inside and outside walls, each wall defining a longitudinal central groove, the upper and lower walls defining a pair of aligned substantially rectangular slots through the grooves near each end of each beam, the rectangular slots longitudinal axes being parallel to the beam longitudinal axis;

(ii) at least one generally U-shaped intermediate base element interposed between the parallel rectangular beams, the base element having upturned side portions connected to the respective inside walls of the beams, thereby connecting the beams to each other;

(iii) a wiring channel supported by the base element and having a pair of laterally spaced upstanding resilient side walls terminating in transverse tabs extending laterally outwardly from the side walls to be resiliently received in the grooves of the beams inside walls; and (b) an auxiliary connecting element comprising at least three substantially identical bar segments mutually connected at one end of each bar segment to each other and arranged at an angle to each other;

(c) a pair of connecting elements for rigidly connecting a longitudinally aligned bar segment to each bar segment of the auxiliary connecting element, each connecting element having a center portion interposed between aligned ends of a pair of bar segment beams, each connecting element having coaxial tabs oppositely extending from the center portion and being received within the aligned ends of a pair of beams, each tab having a generally rectangular transverse slot therethrough aligned with the slots in the beam upper and lower walls when the tab is inserted into the beam ends; and (d) a pair of pins associated with each connecting element, each pin having a generally rectangular shank being inserted through a slot in the beam upper wall and through the aligned slot in the connecting element tab, the pin having a head larger than the beam slot for resting on the beam upper wall.

* * * * *